United States Patent [19]

Akhtar

[11] Patent Number: 5,487,918
[45] Date of Patent: Jan. 30, 1996

[54] METHOD OF DEPOSITING METAL OXIDES

[76] Inventor: Masud Akhtar, 8 Wexford Dr., Lawrenceville, N.J. 08648

[21] Appl. No.: 837,216

[22] Filed: Feb. 18, 1992

Related U.S. Application Data

[63] Continuation-in-part of Ser. No. 523,326, May 14, 1990, Pat. No. 5,089,248.

[51] Int. Cl.⁶ .............................. C23C 16/40; B05D 3/02
[52] U.S. Cl. ...................................... 427/255.3; 427/376.2
[58] Field of Search .................................... 427/226, 255, 427/255.3, 453, 376.2

[56] References Cited

U.S. PATENT DOCUMENTS

| | | | |
|---|---|---|---|
| 3,009,833 | 11/1961 | Somerville | 117/161 |
| 3,509,073 | 4/1970 | Bowman | 252/518 |
| 3,801,314 | 4/1974 | Goffe | 96/1 R |
| 4,395,443 | 7/1983 | Shimuza et al. | 427/387 |
| 4,788,079 | 11/1988 | Lindner | 427/166 |
| 4,927,704 | 5/1990 | Reed et al. | 427/255.3 |
| 5,028,566 | 7/1991 | Lagendijk | 427/255.3 |
| 5,069,930 | 12/1991 | Hussla et al. | 427/255.3 |
| 5,089,248 | 2/1992 | Akhtar | 423/604 |

OTHER PUBLICATIONS

Hackh's Chemical Dictionary, McGraw Hill, 1969 p. 481.

Primary Examiner—Shrive Beck
Assistant Examiner—Bret Chen
Attorney, Agent, or Firm—George E. Kersey

[57] ABSTRACT

Metal oxide fine powders and thin films prepared by exchange reactions between organosemiconductor oxides (such as disiloxanes) and metal coordination compounds, metallic halides, or organometallic compounds in inert environments and anhydrous solvents.

18 Claims, No Drawings

METHOD OF DEPOSITING METAL OXIDES

This invention is a continuation-in-part of U.S. patent application Ser. No. 07/523,326, filed May 14, 1990, now U.S. Pat. No. 5,089,248 issued Feb. 18, 1992.

BACKGROUND OF THE INVENTION

The invention relates to the production of metallic oxides, and more particularly, to the production of such oxides under "mild" reaction conditions, to form grain sizes in the range from 0.2 to 100 microns, in addition to their production in the form of transparent or opaque coatings.

There is a need for a wide variety of metallic oxides. They are used as transparent electrical conductors, superconductors, electrochromic materials and catalysts. They are also used for battery electrodes and electrolytes, coatings, paints, membranes and ceramic bodies. The available production methods for such oxides are not entirely satisfactory.

Generally, metallic oxide production is by hydrothermal reactions of metal salts, metal alkoxides, and sol-gels, followed by pyrolysis. These methods involve material degradation, and the inclusion of different chemical compositions in the bulk material phase. Other methods use RF (radio frequency) sputtering from compact metal oxide targets; CVD (chemical vapor deposition) or plasma processes in volatile metal oxide precursor compounds; or high temperature pyrolysis of metal-organic compounds. These methods have drawbacks such as possible inclusion of impurities due to energetic and high temperature environments, undesired residues, and associated high processing costs, as well as environmental and personnel hazards.

Accordingly, it is an object of the invention to facilitate and simplify the production of metallic oxides, and to realize oxide compositions at low cost, avoiding many of the objections associated with prior and current methods.

Another object of the invention is to deposit metallic oxides at a comparatively low temperature, while simultaneously maintaining a comparatively high rate of deposition. A related object is to facilitate the depositions in thin film form.

A further object of the invention is to achieve electroactive oxide deposits with controlled thickness or particle size. A related object is to achieve controlled thicknesses which have increased uniformity of thickness.

A still further object of the invention is to achieve the deposit of metal oxides on general substrates with prescribed a real configurations.

SUMMARY OF THE INVENTION

In accomplishing the foregoing and related objects, the invention provides for the production of metal oxides by facile chemical reactions between organosemiconductor oxides and metallic compounds, including halides, organometallics and coordination compounds (such as metal chelates, chlorometalates, and neutral metal complexes). The reaction takes place in an inert environment, such as that provided by an anhydrous solvent or other inert medium from which water, oxygen and nitrogen have been excluded, for example by desiccation.

Illustrative organosemiconductor oxides include those of carbon, silicon and germanium semiconductors, particularly the organocarboxanes, -siloxanes and -germoxanes. Dicarboxanes, siloxanes and germoxanes are preferred.

The metallic component is selected from Group IA (including lithium, sodium, potassium, rubidium, cesium and francium), Group IB (including silver, gold and copper), Group IIA (including beryllium, magnesium, calcium, strontium, barium and radium), Group IIB (including zinc, cadmium and mercury), Group IIIA (including indium, aluminum, gallium and thallium), Group IV A (including tin, lead and germanium), Group IV B (including zirconium, titanium and hafnium), Group VIB (including molybdenum, chromium and tungsten), Group VIII (including iridium, cobalt and rhodium), and other transition metals (including nickel, palladium, platinum, vandium, niobium and tantalum).

In the case of neutral metal complexes, the coordinating ligand used in their preparation makes their resulting complexes soluble in organic, i.e. anhydrous solvents and results in a low melting compound. In organic liquid solutions, the ligand is easily labile, can be sterically unhindered, and leaves the reaction site after oxide deposition. The ligand is a low cost and nontoxic compound. The presence of such ligands in the complex, inhibits undesired side reactions, such as a disproportionate amount of metal halide salts. The ligands also displace water of crystallization associated with certain metal salts, moderate otherwise vigorous reactions, and facilitate controlled oxide deposition reactions in dry and inert environments from coating compositions of desired viscosity and components.

The deposition reactions are carried out in an inert gas atmosphere such as argon or helium, and can involve liquid-liquid, solid-liquid, solid-gas, liquid-gas or gas-gas reactions.

In accordance with one aspect of the invention a method of preparing metallic oxides includes the steps of (a) providing a solution of a metallic compound in an anhydrous solvent; and (b) reacting the metallic compound with a Group IV organosemiconductor oxide. The organosemiconductor oxide reacts with the metallic compound to deposit a metallic oxide, and the reaction site is left with a volatile or soluble organosemiconductor residue.

The metallic compound is a metallic coordination compound, such as a metal complex containing ligands coordinating through nitrogen, phosphorous, oxygen or sulfur atoms. Or the metallic coordination compound can be selected from the class of metal chelates and chlorometalates.

Alternatively, the metallic compound can be a metallic halide or an organometallic compound.

In accordance with another aspect of the invention, the organosemiconductor oxide is an organosilicon oxide, such as a siloxane, which can be selected from the class consisting of hexamethyldisiloxane, hexaethyldisiloxane, hexaphenyldisiloxane and 1, 1, 3, 3-tetraphenyl-1-3-dimethyldisiloxane.

In a method of producing a metallic oxide coating, the steps can include (a) dissolving a metallic halide in an organic solvent; and (b) reacting the metallic halide in solution with a siloxane at a temperature in the range of from about −20° to 300° C.

The metallic halide can be formed from Group II and III elements including zinc and aluminum. The process stream can include the introduction of halogenous boron compounds, such as boron trichloride and boron trifluoride, in the range from about 1–10% by weight. When the deposition takes place at about 100° C., it produces a coating with a resistivity of about $2 \times 10^{-3}$ ohm-centimeter, a thickness of about one to three microns and a transmissibility for light of about 80 to 95%.

The deposit can be made by spraying on a glass substrate at a temperature of about 250° C. and an aerosol used as a carrier for the reactants.

In a method of producing zinc oxide, the steps can include (a) providing zinc chloride dissolved in ethyl ether; and (b) reacting the zinc chloride with hexamethyldisiloxane in ether at a temperature in the range from about −20° to 100° C.

When zinc chloride dipyridine is employed as the reactant in dichloromethane solvent the result is the production of zinc oxide particles of submicron size.

When different concentrations of reactants are employed at a temperature in the range from 20° to 600° C. there is control of particle size.

In a method of depositing transition metal oxide particles, the steps include (a) providing a transition metal neutral complex in dichloromethane; and (b) reacting the metal complex with a stoichiometric amount of hexamethyldisiloxane at a temperature in the range from about 20° to 100° C.

For the deposit of transition metal oxide thin films having a thickness of about 100 Å to 3000 Å, the steps include (a) providing a transition metal neutral complex in benzene, and (b) reacting the metal complex with a stoichiometric amount of hexamethyldisiloxane at a temperature in the range from 20° to 100° C.

The transition metal oxide can be deposited on a glass substrate at a temperature in the range from 100° to 500° C. and an aerosol used as a carrier for the reactants.

The foregoing, as well as other aspects and advantages of the invention, will be apparent from the detailed description which follows.

DETAILED DESCRIPTION OF THE INVENTION

The invention is illustrated by the following, nonlimiting examples.

1. Preparation of Group IA Oxides

The oxides of lithium, sodium and potassium are prepared by the reaction of respective metal fluoride powders of grain size 50 microns with hexamethyldisiloxane under reflux.

When equal volumes of ethyl ether solutions of two molar methyllithium and one molar hexamethyldisiloxane are mixed at room temperature or below, lithium oxide $Li_2O$ is deposited, leaving tetramethylsilane $Si(CH_3)_4$ in the solvent.

2. Preparation of Group IB Oxides

A copper oxide thin film of 5 micron thickness is grown on a clean copper metal substrate by placing the substrate at 210° C. in the vapors of copper-bis-(hexafluoroacetylacetonate) and hexamethyldisiloxane, which are carried by argon gas.

Silver oxide is prepared by passing disiloxane $(H_3Si)_2O$ vapor over silver difluoride of particle size 10 microns at 60° C. and in an atmosphere of argon.

Gold oxide, $Au_2O_3$, is prepared by passing the vapor of dichlorodisiloxane $(H_4Cl_2Si)_2O$ over gold chloride $Au_2Cl_6$ at 120° C. in an atmosphere of argon.

In an alternative prepartion of silver oxide, a metallic compound in the form of silver chloride (AgCl) is dissolved (about 190 gm/liter) in calcium chloride ($CaCl_2$) saturated dimethylsulfoxide to form $Ca(AgCl_2)_2$.

Silver oxide is then produced by treating the foregoing solution with a stoichiometric amount of hexamethyldisiloxane in ethyl ether.

$Ag_2O$ immediately precipitates, leaving calcium chloride and trimethyl-chlorosilane in the supernatent liquid.

The reaction is summarized in equation (1), below.

$$2AgCl+(CH_3)_3Si)_2O \rightarrow Ag_2O+2(CH_3)_3SiCl \tag{1}$$

The particle size of $Ag_2O$ can be controlled by adjusting the concentration of the reactants. Silver oxide produced by this process is very pure. It possesses superior material properties, when washed and dried from residual solvent.

3. Preparation of Group IIA Oxides

Beryllium chloride 0.1 molar in ethyl ether is added to an equimolar solution of hexamethyldisiloxane in ether at 80° C. to produce beryllium oxide powder of 0.2 micron grain size.

Magnesium oxide powder of 10 micron grain size is prepared by the above technique where magnesium chloride is 0.2 molar in tetrahydrofuran and generated in-situ by reacting magnesium with 1,2-dichloroethane in tetrahydrofuran.

Calcium oxide is prepared by the foregoing method, but using calcium chloride solution in dimethylsulfoxide.

Magnesium oxide also is prepared by passing hexachlorodisiloxane over magnesium chloride at 120° C.

4. Preparation of Group IIB Oxides

Zinc oxide of particle size ranging from about 0.1 micron to 0.5 micron is prepared by mixing equimolar solutions of zinc chloride and hexamethydisiloxane in ethyl ether at a temperature of 60° C.

At temperatures higher than 60° C., and less than 100° C., the oxide deposition is very rapid. Conductive zincite can be prepared with a desired particle size by controlling the reactant concentrations and employing about 1.0% aluminum chloride.

Oxides of zinc, cadmium and mercury are prepared by pyrolysis of respective dimethyl metal compounds at 100° C. in the presence of hexamethyldisiloxane vapor under an inert atmosphere.

Transparent conductive coatings of zinc oxide are produced by passing mixtures of dimethylzinc and hexamethyldisiloxane on a common glass substrate in the temperature range of 60° to 150° C. Boron or aluminum alkyls in the 0.5–10 percent weight range act as dopants to control the film conductivity. Such films of zinc oxide can be further heated at 250° C., or above, to control the crystalline morphology of the deposit. Such films are 80–92% transparent for light in the visible range, with 0.5 to 3 microns in thickness. A typical resistivity of boron doped zinc oxide of 2.5 micron thickness is $3 \times 10^{-3}$ ohm-centimeters.

When triethyleneglycoldiamine complex of zinc chloride is added to an equimolar solution of hexamethydisiloxane in ethylether or dichloromethane, greater control over the deposition of zinc oxide particles is achieved.

When compounds like $AlCl_3$ or $InCl_3$ are included with the zinc chloride in a molar concentration of 1–4%, conductive zinc oxide particles are achieved. A compressed pellet of aluminum doped zinc oxide (produced at 800psi) with 0.5 mm thickness had a resistivity of $10^{-5}$ ohm cm.

By adjusting concentrations and reaction temperatures in the range of −20° to 100° C., zinc oxide particles with controlled dimensions are easily prepared and find many applications such as use in varistor materials, coatings and powders. Similarly, zinc oxychlorides can also be prepared by controlling the reactant ratios.

Transparent conductive coatings of-zinc oxide doped with boron or aluminum can be deposited by mixing 0.5–19 by weight percent boron or aluminum halides or alkyls in ether solutions of $ZnCl_2.2Py$ (where Py is 2-methoxypyridine)

and reacted with stoichiometric amounts of $((CH_3)_3Si)_2O$ in a minimum volume of ether. The viscosity of these compositions can be adjusted by suitable amounts of solvents to give stable and processable coating compositions. Substrates (glass, metallic or ceramic) or devices coated with these compositions, and heated under argon in the temperature range of 50° to 100° C., can be covered by zinc oxide thin films of desired thickness. Such films are 80–92% transparent for light in the visible range, with 0.5 to 3 microns in thickness. A typical resistivity of boron doped zinc oxide is $2\times10^{-3}$ ohm-centimeters. Such films of zinc oxide can be further heated at 250° C. or above to control the crystalline morphology of the deposit.

Transparent conductive coatings of zinc oxide can also be produced by spraying the mixtures of $ZnCl_2$ and $((CH_3)_3Si)_2O$ on a common substrate surface at a temperature in the range from about 100° to 600° C.

By this process, transparent conductive coatings of ZnO can be deposited on very large area substrates at low cost. Such coatings find applications in the manufacture of low emissivity structural glass, and as window material for photovoltaic devices, among numerous other uses.

5. Preparation of Group IIIA and IIIB Oxides

Oxides of scandium, yttrium and lanthanum are prepared by selecting the desired metal trifluoride and reacting it with hexamethyldisiloxane vapor at 100° C.

A mixture of $YF_3$ (90%) and $BiF_3$ (10%) with a particle size of 2.5 microns is placed in a quartz tube and heated to 150° C. under a vapor of $(H_3Si)_2O$, 10 cc/min. argon carrier gas, to yield mixed metal oxides.

Thin coatings of aluminum oxide, 2.5 microns thick. are deposited on glass, as well as on aluminum substrates by passing argon gas (100 cc/min) separtely through reservoirs of hexamethyldisiloxane and tri-isobutylaluminum, and combining both reactants in a depostion furnace at 200° C.

When mixtures of indium trichloride with small amounts of tin tetrachloride in ethylether are sprayed on a hot glass substrate at 300° C., along with equimolar solutions of hexamethyldisiloxane in ether, a transparent conductive coating of indium tin oxide is obtained with a resistivity of $10^{-2}$ ohm cm and a thickness of 1.5 microns.

It will be appreciated that other Group IIIA metals can be substituted for indium.

6. Preparation of Transition Metal Oxides

Oxides of the first, second and third transition series (scandium to gold) can be readily prepared by reacting the metal halide, oxyhalide, organometallic hydride or coordination compound with a disiloxane in a wide temperature range.

Titanium bromide is coated over a titanium substrate and placed under a vapor of hexamethyldisiloxane carried by argon gas. The temperature of the deposition furnace is raised slowly to 100° C., which gives a 2 micron coating of titanium oxide over the titanium substrate.

Hafnium oxide similarly is prepared by using hafnium bromide.

When equimolar solutions of zirconium chloride and hexamethyodisiloxane are heated to reflux in ethyl ether, zirconium dioxide is deposited in quantitative amounts.

Vanadium oxyfluoride $VOF_3$ is converted to $V_2O_5$ by passing hexamethyldisiloxane over it at 100° C. It will be appreciated that $CrF_3$, $NbF_5$, $MoF_5$, $TeF_5$, $RuF_5$, $RhF_5$, $TaF_5$, $WOF_3$, $ReF_5$, $OsF_5$, $IrF_5$ and $PtF_5$ can be substituted for vanadium oxyfluoride in the foregoing reaction.

When $WF_6$ vapor carried by argon gas is mixed with a vapor of hexamethyldisiloxane in the reaction zone at 200° C., transparent 0.5 micron thick films of $WO_3$ are deposited over glass substrates within 10 minutes. Film thicknesses of 2 microns are obtained within 50 minutes using the argon flow rate of 50 cc/min. over both reactants.

When equimolar solutions of hexamethyldisiloxane and 1,2-ethylene morpholine complex of copper chloride are refluxed in nitrobenzene, copper oxide is quantitatively deposited. Cobalt and nickel can be substituted in the doregoing reaction.

A benzene solution of ruthenium acetylacetonate is added to hexamethyldisiloxane under reflux at 100° C., and ruthenium oxide of 50 micron grain size is quantitatively precipitated.

Most of the metals of the first transition series, as well as many others in the Periodic Table, form neutral complexes with pyridine ($Py—C_5H_5N$) and aniline ($C_6H_5NH_2$), of the type $MX_2Py$, where M is a metal ion and X is a halide ion. These complexes have limited solubility in organic solvents, but the use of substituted pyridines like 4-methylpyridine, 2-methylpyridine, 2-ethylpyridine, 4-tet-butylpyridine, greatly enhances their solubility in ordinary solvents like dichloromethane, alcohols, dimethylformamide, benzene or nitrobenzene.

When stoichiometric amounts of the solutions of these complexes are added to hexamethyldisiloxane solutions, the required metal oxides can be deposited in a very pure form at temperatures in the range from about 20°–100° C.

The deposited oxides can be further converted into desired phases or modifications by known processes.

Instead of neutral complexes, several simple chelates such as complexes of 1,2-ethylene morpholine ($O(CH_2—CH_2)_2NCH_2CH_2N(CH_2CH_2)_2O$) can also be employed as feedstock for the specific oxide depositions. For example, when equimolar solutions of hexamethyldisiloxane and 1,2-ethylene morpholine complex of nickel chloride (Ni(ethylenemorpholine)$Cl_2$) are refluxed in nitrobenzene, nickel oxide is quantitatively deposited.

The molybdenum complex, tribromotripyridinemolybdenum ($MoBr_3Py_3$, where Py is pyridine), is moderately soluble in chloroform. When a chloroform solution of this complex is added to an excess of one molar dichloromethane solution of hexamethyldisiloxane at a temperature in the range from about 20° to 50° C., molydenum oxide, $MoO_3$, settles at the bottom of the reaction vessel.

Iridium complexes of the type $Ir(CO)_2ClL$, where L is a para-toluidine ligand (p-$H_2N$-$C_6H_4$-$CH_3$), are monomeric and very soluble in benzene. When benzene solutions of such complexes are added to stoichiometric solutions of hexamethyldisiloxane in 2:1 benzene:petroleum ether (boiling point 100°–120° C.) at 20° to 60° C., iridium oxides, $IrO_x$ precipitates.

The foregoing examples are merely illustrative, and other reactions and methods in accordance with the invention will be readily apparent to those of ordinary skill in the art.

What is claimed:

1. A method of depositing metallic oxides on a substrate, consisting essentially of:

(a) providing a metallic compound in an inert atmosphere, said metallic compound containing a metal selected from the group consisting of Group 1A to Group VIII metals;

(b) reacting said metallic compound with an organosemiconductor oxane to deposit a metallic oxide.

2. A method of depositing metallic oxides in accordance with claim 1 wherein said inert atmosphere is anhydrous.

3. A method of depositing metallic oxides in accordance with claim 1, wherein the metallic compound is zinc chloride, the reaction temperature of said metallic compound with said organosemiconductor oxane is between 60°–150° C., and the deposited metallic oxide is zinc oxide.

4. A method of preparing metallic oxides in accordance with claim 1 further including the step of producing a conductive metal oxide by including a metallic halide with the metallic compound in a molar concentration of 1–4%.

5. A method of depositing metallic oxides in accordance with claim 1, wherein the metallic oxide is heated at 250° C. or above to control the crystallinity of said metallic oxide.

6. A method of preparing metallic oxides in accordance with claim 1 wherein a metallic compound in the form of a mixture of indium trichloride with tin tetrachloride in ethylether is sprayed on a hot glass substrate at 300° C., along with equimolar solutions of hexamethyldisiloxane in ether, to provide a transparent conductive coating of indium tin oxide.

7. The method of claim 1 wherein said organosemiconductor oxane is a siloxane.

8. The method of claim 1 wherein the step of reacting said metallic compound with organosemiconductor oxide comprises:

(a) dissolving a metallic component in the form of a halide in an organic solvent; and (b) reacting said metallic halide in solution with an organosemiconductor oxane in the form of a siloxane at a temperature in the range of from about –20° to 300° C.

9. A method of depositing a metallic oxide coating on a substrate, comprising:

(a) providing a solution of an organometallic compound containing a metal in an inert atmosphere, said metal selected from the group consisting of Group IA metals such as lithium, Group IB metals such as silver, Group IIA metals such as beryllium, Group IIB metals such as zinc, Group IIIA metals such as indium, Group IVA metals such as tin; Group IVB metals such as zirconium, Group VIB metals such as moiybdenum, and Group VIII metals such as iridium and nickel; and (b) reacting said organometallic compound with an organosemiconductor oxane to deposit a metallic oxide.

10. A method of depositing a metallic oxide in accordance with claim 9.

11. The method of claim 1 for producing a coating from dimethylzinc said dimethylzinc and hexamethyldisiloxane are combined at a temperature of about 100° C. further including the introduction of a halogeneous boron compound in the 1.0–10% range; said coating having a 2.5 micron thickness and a transmittance for light of about 80 to 95% and a resistivity of $3\times10^{-3}$ ohm-centimeters.

12. The method of claim 9 wherein said organosemiconductor oxane is selected from the group consisting of hexamethyldisiloxane, hexaethyldisiloxane, hexaphenyldisiloxane, and 1, 1, 3, 3-tetraphenyl-1-3-dimethyldisiloxane.

13. A method of depositing a transition metal oxide on a substrate, comprising (a) providing a transition metal compound in an organic solvent to form a metal complex, and (b) reacting said metal complex with an organosiloxane to deposit a transition metal oxide.

14. A method of depositing a transition metal oxide in accordance with claim 13, wherein the organic solvent is benzene, the organosiloxane is stoichiometric hexamethyldisiloxane, and the reaction temperature of said metal complex with said organosiloxane is between 20° and 200° C.

15. The method of claim 13 wherein the resulting transition metal oxide is carried by an aerosol carrier further including the step of depositing on a substrate at a temperature in the range from 100° to 500° C., with a thickness of about 100 Å to about 3,000 Å.

16. The method of claim 13 wherein said transition metal compound is a metal compound selected from the group consisting of metal chelates and chlorometalates.

17. A method of preparing metallic oxides which comprises the steps of:

(a) providing a solution of a metallic compound in an anhydrous solvent; and (b) reacting said compound with a Group IV organosemiconductor oxide;

whereby said organosemiconductor oxane reacts with said metallic compound to deposit a metallic oxide leave a volatile or soluble organosemiconductor residue.

18. The method of claim 17 wherein different concentrations of reactants are used in the temperature range of from about 20° to 600° C.

* * * * *